(12) United States Patent
Chiba et al.

(10) Patent No.: US 9,804,484 B2
(45) Date of Patent: Oct. 31, 2017

(54) DISPLAY DEVICE

(75) Inventors: Masaki Chiba, Tokyo (JP); Naoki Masuda, Tokyo (JP)

(73) Assignees: NEC Corporation, Tokyo (JP); NEC Display Solutions Ltd., Tokyo (JP)

( * ) Notice: Subject to any disclaimer, the term of this patent is extended or adjusted under 35 U.S.C. 154(b) by 156 days.

(21) Appl. No.: 13/700,110

(22) PCT Filed: May 18, 2011

(86) PCT No.: PCT/JP2011/061434
§ 371 (c)(1),
(2), (4) Date: Nov. 26, 2012

(87) PCT Pub. No.: WO2011/152217
PCT Pub. Date: Dec. 8, 2011

(65) Prior Publication Data
US 2013/0070453 A1    Mar. 21, 2013

(30) Foreign Application Priority Data
May 31, 2010   (JP) .................. 2010-125109

(51) Int. Cl.
  *H04N 9/31*   (2006.01)
  *G03B 21/16*  (2006.01)
  *G03B 21/20*  (2006.01)

(52) U.S. Cl.
  CPC ........... *G03B 21/16* (2013.01); *H04N 9/3144* (2013.01); *G03B 21/2033* (2013.01)

(58) Field of Classification Search
  CPC ... H01L 23/427; H01L 23/473; H01L 23/367; H01L 33/64; H01L 33/648;
  (Continued)

(56) References Cited

U.S. PATENT DOCUMENTS 5,375,582 A * 12/1994 Wimer .................. 123/563
7,174,727 B2 * 2/2007 Kim et al. ............... 62/115
(Continued)

FOREIGN PATENT DOCUMENTS

CN    1779555 A    5/2006
CN    1944978 A    4/2007
(Continued)

OTHER PUBLICATIONS

International Search Report in PCT/JP2011/061434 dated Jun. 14, 2011(English Translation Thereof).
(Continued)

*Primary Examiner* — Elmito Breval
*Assistant Examiner* — Fatima Farokhrooz
(74) *Attorney, Agent, or Firm* — McGinn IP Law Group, PLLC

(57) ABSTRACT

A display device is provided with a plurality of solid-state light sources (101-103) and a coolant-circulating means (100) that is equipped with a flow path (100a) formed to pass through each of the solid-state light sources (101-103) and that circulates a coolant via the flow path (100a). Each of the solid-state light sources (101-103) has the property that the luminance thereof changes in response to a temperature change. The flow path (100a) is formed such that the coolant first passes through solid-state light sources having a greater degree of luminance change according to the above-described property of the solid-state light sources (101-103).

16 Claims, 9 Drawing Sheets

(58) Field of Classification Search
CPC ........... H01L 21/67115; H01L 23/3672; H01L 25/115; H01L 25/0753; H01L 2023/4056; H01L 23/38; H01L 31/024; H01L 31/052; G03B 21/16; G03B 21/20
USPC ......... 349/161; 348/749, 748; 362/373, 294, 362/264; 352/52, 54, 119
See application file for complete search history.

(56) References Cited

U.S. PATENT DOCUMENTS

| | | | |
|---|---|---|---|
| 7,543,962 B2* | 6/2009 | Miwa et al. | ................... 362/294 |
| 7,578,595 B2* | 8/2009 | Miwa et al. | ..................... 353/54 |
| 8,002,415 B2* | 8/2011 | Nakamura | ............ G03B 21/006 353/52 |
| 2003/0205963 A1* | 11/2003 | Ando | ............................ 313/495 |
| 2004/0202007 A1* | 10/2004 | Yagi et al. | ..................... 362/545 |
| 2005/0157269 A1* | 7/2005 | Seto | ........................ G03B 21/16 353/61 |
| 2006/0082732 A1 | 4/2006 | Miwa et al. | |
| 2006/0198150 A1* | 9/2006 | Kinoshita | ................. F28F 3/12 362/373 |
| 2007/0068653 A1* | 3/2007 | Kondou | ................. F28D 1/0477 165/80.4 |
| 2007/0084585 A1* | 4/2007 | Takagi | .................. F28D 9/0043 165/80.4 |
| 2007/0114010 A1* | 5/2007 | Upadhya | ........... G02F 1/133603 165/121 |
| 2007/0279938 A1 | 12/2007 | Miwa et al. | |
| 2008/0142190 A1* | 6/2008 | Chang et al. | .................... 165/44 |

FOREIGN PATENT DOCUMENTS

| | | |
|---|---|---|
| JP | 2007-165481 A | 6/2007 |
| JP | 2007-165632 A | 6/2007 |
| JP | 2008-268616 A | 11/2008 |
| JP | 2009-031557 A | 2/2009 |
| JP | 2010-020049 A | 1/2010 |

OTHER PUBLICATIONS

Chinese Office Action dated Aug. 22, 2014 with an English Translation thereof.

* cited by examiner

DISPLAY DEVICE

TECHNICAL FIELD

The present invention relates to a display device of which a liquid crystal display or a projector is representative, and more particularly to a display device that is provided with the capability of cooling a solid-state light source such as an LED (Light-Emitting Diode) or semiconductor laser.

BACKGROUND ART

Projectors equipped with LEDs, in which each LED has a corresponding red (R), green (G) or blue (B), are known. Typically, LEDs have a property by which luminance (illuminance) decreases in response to an increase in the temperature. In order to realize a projector having higher luminance, the LEDs must therefore be cooled to prevent a reduction of luminance (illuminance).

In Patent Document 1, a liquid cooling system is described in which each LED having a corresponding red, green or blue color is cooled.

In the liquid cooling system described in Patent Document 1, attention is given to the difference in the amount of heat generated by the LEDs of each color, with cooling proceeding in order from LEDs having a greater amount of generated heat. More specifically, this cooling system includes: a pump, a single flow path by which a coolant that is supplied from this pump circulates, a radiator that cools the coolant that has flowed within this flow path, and a fan that supplies cooling air to this radiator.

The above-described flow path is formed so as to transfer heat-conductive parts provided in each red, green and blue, starting with the LED that generates the largest amount of heat and finishing with the LED that generates the least amount of heat. Normally, the amount of heat generated by a green LED is greatest, followed by the amount of heat generated by a blue LED. The amount of heat generated by a red LED is the smallest.

In the above-described liquid cooling system, coolant that is supplied from the pump passes through the heat-conductive parts of the green LED for which the amount of generated heat is greatest. The green LED is cooled here by the heat exchange that takes place between the heat-conductive part and the coolant, but the temperature of the coolant is also raised by this heat exchange.

The coolant that has passed by way of the heat-conductive part of the green LED passes through the heat-conductive part of the blue LED, and then passes through the heat-conductive part of the red LED. When the coolant passes through each of the heat-conductive parts of the blue LED and red LED, heat exchange takes place between the heat-conductive parts and the coolant, by which the blue LED and red LED are cooled but the temperature of the coolant is also raised by the heat exchange.

The coolant that has passed through the heat-conductive part of the red LED, after being cooled in the radiator, is returned to the pump.

In Patent Document 2, a configuration is described in which a cooling system that cools the light source part in which the amount of heat that has been generated is greatest is provided separately from a cooling system that cools other light source parts. By means of this configuration, the light source part in which a cooling system that cools the light source part in which the amount of heat that has been generated is greatest and other light source parts are each cooled by independent cooling systems, whereby the light source parts can be effectively cooled.

LITERATURE OF THE PRIOR ART

Patent Documents

Patent Document 1: Japanese Unexamined Patent Application Publication No. 2009-31557
Patent Document 2: Japanese Unexamined Patent Application Publication No. 2007-316626

SUMMARY OF THE INVENTION

However, because cooling is effected in order from LEDs having the greatest amount of generated heat in the liquid cooling system described in Patent Document 1, the following problems arise.

A red LED typically undergoes a greater change in luminance due to temperature changes than a green LED or blue LED. In other words, the change in luminance arising from temperature change of a red LED is steeper than that of a green LED or blue LED. A red LED is therefore more sensitive to temperature changes than a green LED or blue LED, and temperature control of a red LED is therefore of the greatest importance.

In the liquid cooling system described in Patent Document 1, the coolant passes through the heat-conductive part of a red LED after passing through the heat-conductive parts of each of a green LED and blue LED. The temperature of the coolant rises due to heat exchange when passing through the heat-conductive parts of each of the green LED and blue LED, whereby coolant whose temperature has increased is supplied to the heat-conductive part of the red LED. Because it is difficult to obtain a sufficient cooling effect from coolant whose temperature has increased, the temperature of the red LED rises and the luminance of the red LED drops greatly compared to LEDs of the other colors. As a result, the illuminance balance of LEDs of each color changes and the color of white light (white balance), in which light of each of the colors from LEDs of each color is combined, also changes. In order to prevent an increase in the temperature of the red LED, the drive current of the red LED must be limited. As a result, a red LED cannot be used at high luminance.

In the cooling system described in Patent Document 2, the light source parts in which the amount of heat that is generated is great and other light source parts such as a red LED are cooled by independent systems, whereby the red LED can be adequately cooled. In this case, however, components such as a pump and a radiator must be provided for each cooling system and the cost of the liquid cooling system increases accordingly.

The decrease in luminance of each solid-state light source that results from an increase in the temperature of each solid-state light source as described above thus poses a problem. A display device is therefore sought that can obtain optimum white balance and that provides a solution to the problem of inadequate cooling of solid-state light sources that are sensitive to increases in temperature and to the problem of cost increases of the above-described systems.

The display device according to an aspect of the present invention is provided with a plurality of solid-state light sources and a coolant-circulating means that is equipped with a flow path formed to pass via each of the plurality of solid-state light sources and that circulates a coolant by way of the flow path. Each of the plurality of solid-state light sources has a property by which the luminance changes in response to temperature changes. The flow path is formed such that the coolant passes through the plurality of solid-state light sources in the order starting with solid state light-source that have a greater degree of luminance according to the property.

EXPLANATION OF REFERENCE NUMBERS 100 coolant-circulating means
100a flow path
101-103 solid-state light sources

BEST MODE FOR CARRYING OUT THE INVENTION

Exemplary embodiments of the present invention are next described with reference to the accompanying figures.

Figure 1:
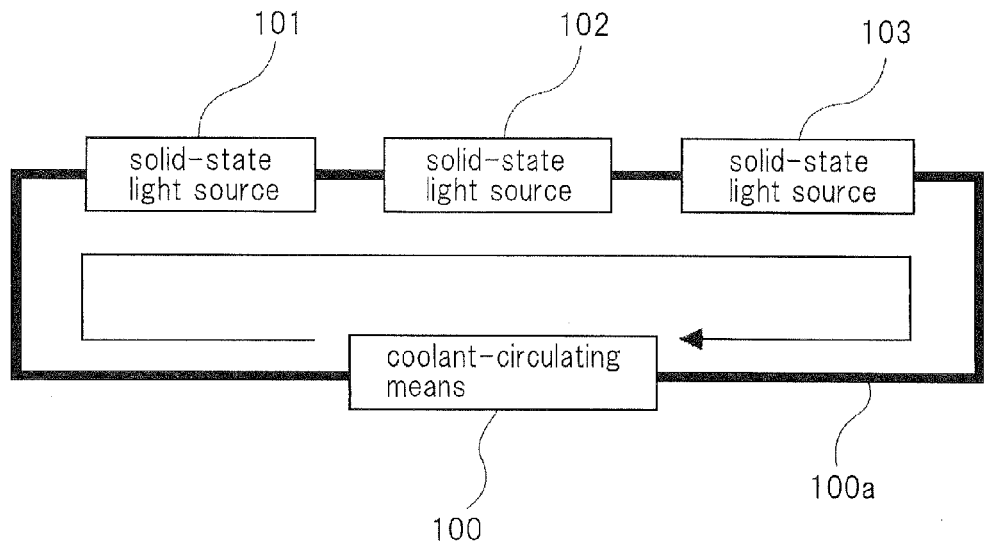
FIG. 1 is a block diagram showing the configuration relating to the cooling system of the display device that is the first exemplary embodiment of the present invention.

FIG. 1 is a block diagram showing the configuration relating to the cooling system of the display device that is the first exemplary embodiment of the present invention.

Referring to FIG. 1, the display device is an image display device whose liquid crystal display is representative, or a projector, and includes solid-state light sources 101-103 in which the colors of emitted light differ and coolant-circulating means 100 that is equipped with flow path 100a that is formed to pass by way of each of these solid-state light sources 101-103 and that circulates a coolant (liquid) by way of flow path 100a. Apart from constructions that relate to the cooling system, the configuration is identical to existing configurations and these constructions are therefore omitted in FIG. 1.

Solid-state light sources 101-103 are LEDs or semiconductor lasers and have a property by which luminance changes according to changes in temperature, the degree of change (the inclination in the characteristics chart) in luminance in this property differing for each emitted color. The degree of change in luminance is the degree of change of luminance with respect to temperature change in, for example, the range of the temperatures of use (a prescribed temperature range). From among solid-state light sources 101-103, solid-state light source 101 has the greatest degree of luminance change, solid-state light source 102 has the next greatest degree of luminance change, and solid-state light source 103 has the smallest degree of luminance change.

Coolant-circulating means 100 includes a pump that supplies coolant to flow path 100a, a radiator that cools the coolant that has flowed through flow path 100a, and a fan that supplies cooling air to the radiator. Flow path 100a may be constituted by a tube having flexibility.

In coolant-circulating means 100, coolant that has been cooled by the radiator is supplied to light sources in the order starting with the light source whose degree of luminance change due to changes in temperature changes is greatest, i.e., in the order of solid-state light source 101, solid-state light source 102, and solid-state light source 103.

The cooling effect realized by the coolant increases as the temperature of the coolant decreases. By means of coolant-circulating means 100, solid-state light sources in which the degree of luminance change is great than other solid state light source are cooled by coolants whose temperatures are lower. In other words, the cooling effect is higher for solid-state light sources that are most sensitive to changes in temperature. As a result, changes in luminance arising from changes in temperature of solid-state light sources 101-103 are prevented as a whole, with the result that the luminance balance (illumination balance) of solid-state light sources 101-103 is maintained and optimum white balance can be provided at high luminance.

According to coolant-circulating means 100, two sets of pumps, radiators, and fans need not be used as in the device described in Patent Document 2, and lower costs can therefore be achieved than for the device described in Patent Document 2.

In the display device of the present exemplary embodiment, solid-state light sources 101, 102, and 103 correspond to a red LED, a green LED, and a blue LED, respectively. The coolant is supplied in the order starting from the solid-state light source in which the degree of change of luminance is greatest, i.e., in the order of red LED, green LED, and blue LED.

Regarding the amount of generated heat, the condition is assumed that the green LED surpasses the blue LED, and the blue LED surpasses the red LED. When LEDs are successively cooled by the coolant, the flow path is formed such that the coolant first passes by way of LEDs which have generated the great amount of heat. However, the display device of the present exemplary embodiment, instead of adopting a cooling method in which the order of cooling is based on this amount of generated heat, focuses on the point that LEDs having a higher degree of change in luminance are more sensitive to temperature, and therefore adopts a novel cooling method in which the order of cooling is based on the degree of change in luminance.

In addition, the amount of heat generated by a green LED is greater than that of a blue LED. In the present exemplary embodiment, a more effective cooling effect can be provided by having the coolant pass by way of the green LED, in which the amount of generated heat is greater, before passing by way of the blue LED.

Coolant-circulating means 100 in the display device of the present exemplary embodiment may further include a plurality of radiators provided in parallel, to which coolant that circulates through flow path 100a is branched and supplied, and fans that are attached to each of the radiators. Compared to a configuration in which each radiator is arranged in series, the parallel configuration of the radiators can reduce the flow speed of the coolant that passes through each radiator.

In a configuration in which each radiator is provided in series, the temperature of the vehicle that flows into radiators that are arranged in later stages is reduced, whereby the cooling effect of the vehicle in later-stage radiators is not high. The cooling effect realized by cooling air increases as the temperature difference between the coolant and the cooling air increases or as the flow speed of the coolant decreases. As a result, adopting a parallel configuration of radiators can increase the cooling effect realized by cooling air and can enable supplying a coolant that has a lower temperature.

Second Exemplary Embodiment

Figure 2:
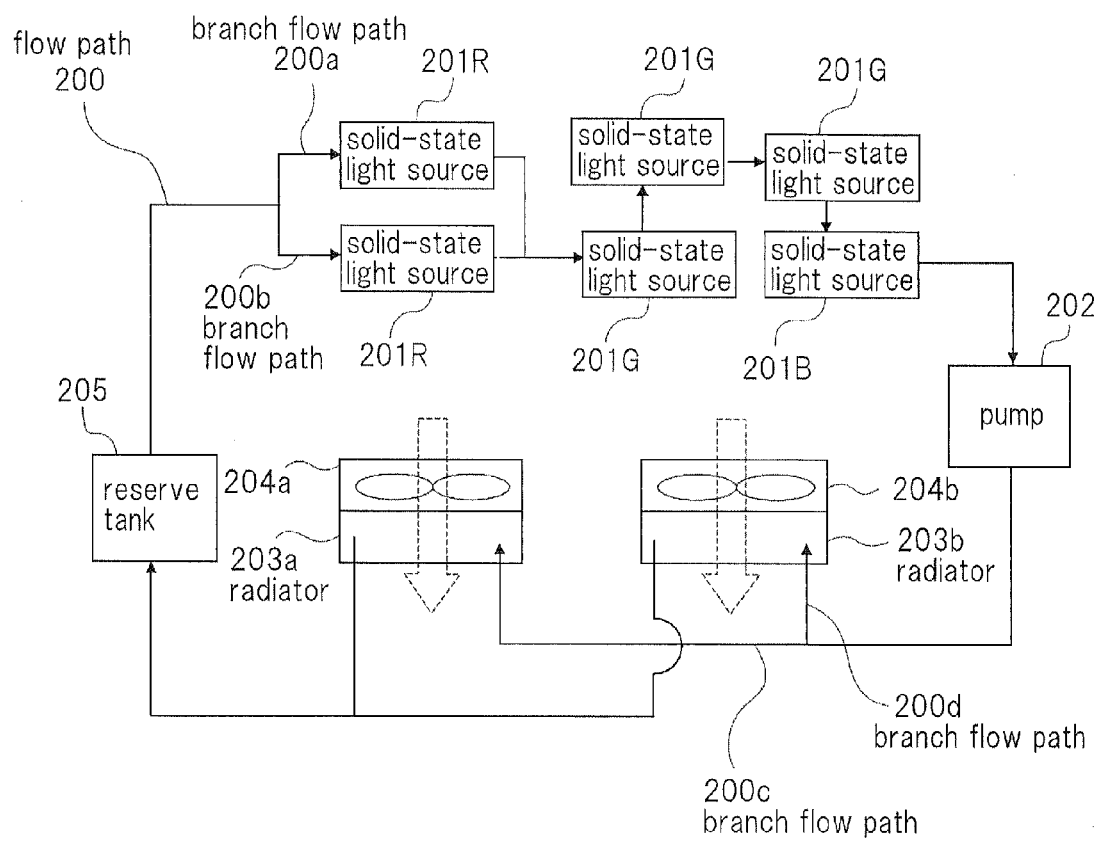
FIG. 2 is a block diagram showing the configuration relating to the cooling system of the display device that is the second exemplary embodiment of the present invention.

FIG. 2 is a block diagram showing a configuration relating to the cooling system of the display device that is the second exemplary embodiment of the present invention.

Referring to FIG. 2, the display device includes: flow path 200 through which coolant (liquid) circulates, first and second solid-state light sources 2018, first to third solid-state light sources 201G, solid-state light source 201B, pump 202, two radiators 203a and 203b, two fans 204a and 204b, and reserve tank 205.

First and second solid-state light sources 201R supply red light. First to third solid-state light sources 201G supply green light. Solid-state light source 201B supplies blue light. Light sources such as LEDs or semiconductor lasers can be used as these solid-state light sources 201R, solid-state light sources 201G, and solid-state light source 201B.

Pump 202 is provided with an outflow port from which coolant flows and an inflow port into which coolant flows, the outflow port being linked to one side of flow path 200 and the inflow port being linked to the other side of flow path 200. Coolant that flows out of the outflow port of pump 202 returns to the inflow port of pump 202 by way of flow path 200 (coolant circulation).

Flow path 200 is formed to pass by way of each of two radiators 203a and 203b, reserve tank 205, first and second solid-state light sources 201R, first to third solid-state light source 201G, and solid-state light source 201B.

Radiators 203a and 203b are provided in parallel. The flow path portion of flow path 200 that passes by way of radiators 203a and 203b is made up of two branch flow paths 200c and 200d that are provided in parallel, radiator 203a being arranged on branch flow path 200c side and radiator 203b being arranged on branch flow path 200d side.

Fan 204a supplies cooling air to radiator 203a. In radiator 203a, coolant that flows within branch flow path 200c is cooled by the cooling air from fan 204a. Fan 204b supplies cooling air to radiator 203b. In radiator 203b, coolant that flows within branch flow path 200d is cooled by the cooling air from fan 204b.

Reserve tank 205 is provided in a flow path portion that comes after the confluence of the coolant that has passed through radiators 203a and 203b. The coolant is temporarily accumulated in reserve tank 205.

First and second solid-state light sources 201R are provided in parallel. The flow path portion of flow path 200 that passes by way of each of solid-state light sources 201R is made up of branch flow paths 200a and 200b that are provided in parallel, first solid-state light source 201R being arranged on branch flow path 200a side and second solid-state light source 201R being arranged on branch flow path 200b side.

First to third solid-state light sources 201G and solid-state light source 201B are provided in series on the flow path portion that follows the confluence of coolant that has passed by way of first and second solid-state light sources 201R. The coolant passes through first solid-state light source 201G, second solid-state light source 201G, third solid-state light source 201G, and solid-state light source 201B, in that order.

The coolant that has passed through solid-state light source 201B is supplied to the inflow port of pump 202.

Flow path 200, pump 202, radiators 203a and 203b, fans 204a and 204b, and reserve tank 205 correspond to coolant-circulating means 100 shown in FIG. 1.

From among solid-state light sources 201R, 201G, and 201B in the display device of the present exemplary embodiment, solid-state light sources 201R have the greatest degree of luminance change, followed solid-state light sources 201G, whose degree of luminance change is smaller. Solid-state light source 201B has the smallest amount of luminance change.

The coolant that is cooled by radiators 203a and 203b first flows via reserve tank 205 and then through branch flow paths 200a and 200b in which are provided first and second solid-state light sources 201R in which the degree of luminance change due temperature change is greatest. In this way, a greater cooling effect can be provided to first and second solid-state light sources 201R.

In addition, the parallel supply of coolant to each of solid-state light sources 201R obtains the effect described hereinbelow.

The temperature of coolant that flows through branch flow paths 200a and 200b is substantially identical, and the cooling effect upon each of solid-state light sources 201R is therefore also substantially identical, whereby each of solid-state light sources 201R can be maintained at substantially the same temperature. As a result, the luminance (quantity of light) of each of solid-state light sources 201R is substantially identical.

In the display device of the present exemplary embodiment, the amount of heat generated by solid-state light sources 201G is greater than that of solid-state light source 201B. Causing coolant to flow by way of solid-state light sources 201G that generate a greater amount of heat than solid-state light source 201B before flowing by way of solid-state light source 201B enables the realization of a more efficient cooling effect.

In the display device of the present exemplary embodiment, radiators 203a and 203b are further provided in parallel. The adoption of this parallel construction of radiators 203a and 203b enables coolant that flows through each of radiators 203a and 203b to flow at a slower speed compared to configuration in which two radiators are provided in series. Accordingly, the cooling effect realized by the cooling air of each of radiators 203a and 203b increases, whereby a greater cooling effect can be provided.

Figure 3:
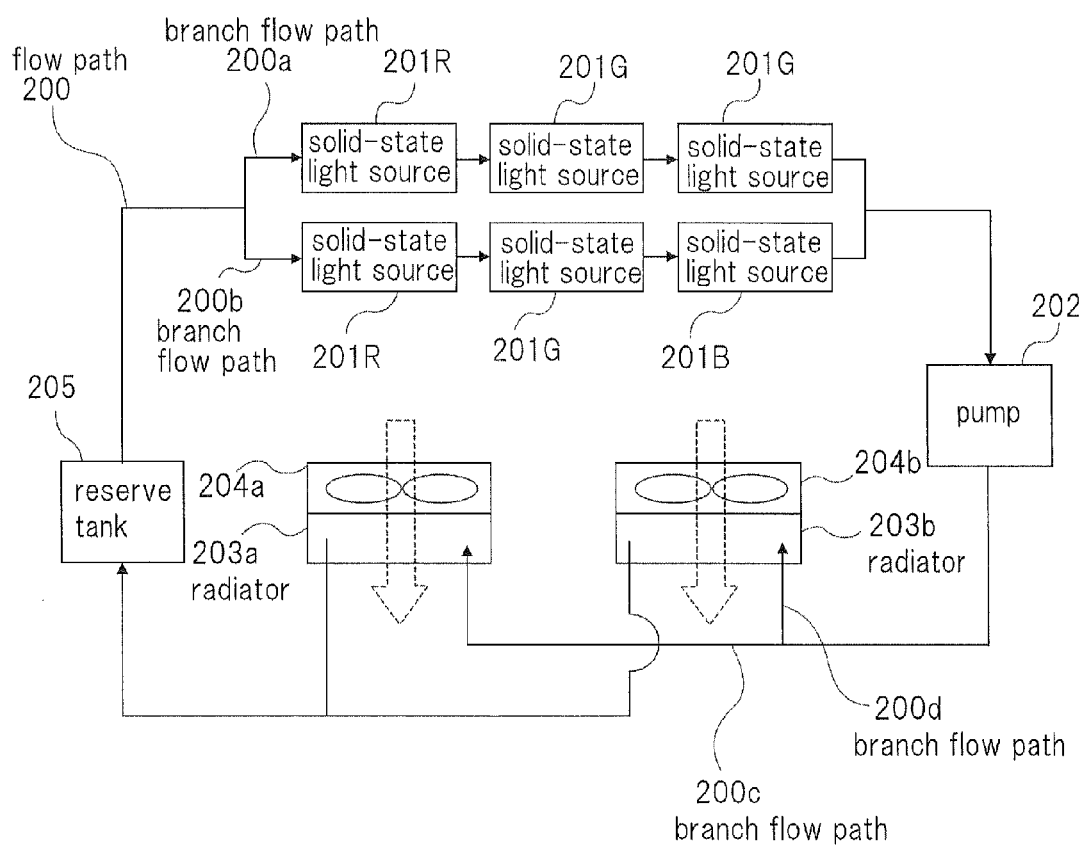
FIG. 3 is a block diagram showing an example of a comparative system.
Figure 4:
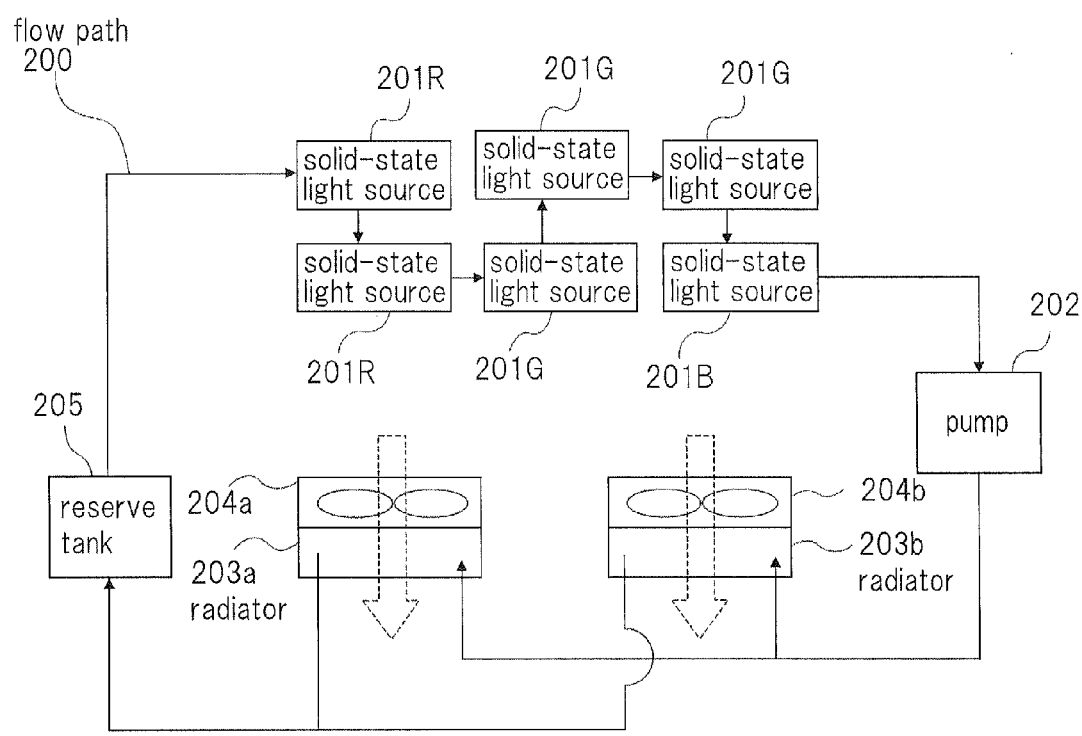
FIG. 4 is a block diagram showing another example of a comparative system.

The effects of the display device of the above-described second exemplary embodiment are next described in greater detail based on a comparison with comparative examples having the configurations shown in FIGS. 3 and 4.

FIG. 3 is a block diagram showing a configuration relating to the cooling system of the first comparative system, and FIG. 4 is a block diagram showing a configuration relating to the cooling system of the second comparative system.

Referring to FIG. 3, the first comparative system includes flow path 200 that circulates a coolant (liquid), first and second solid-state light sources 201R, first to third solid-state light sources 201G, solid-state light source 201B, pump 202, two radiators 203a and 203b, two fans 204a and 204b, and reserve tank 205.

The first comparative system is of the same configuration as the second exemplary embodiment with the exception that the route of flow path 200 differs for solid-state light sources 201R, solid-state light sources 201G, and solid-state light source 201B.

Flow path 200 has branch flow paths 200a and 200b that are provided in parallel, first solid-state light source 201R, first solid-state light source 201G, and second solid-state light source 201G being provided in series in this order on the branch flow path 200a side, and second solid-state light source 201R, third solid-state light source 201G, and solid-state light source 201B being provided in series on the branch flow path 200b side in that order.

The coolant that is cooled by radiators 203a and 203b first passes by way of reserve tank 205 through first and second solid-state light sources 201R, in which the degree of luminance change due to temperature change is greatest, whereby a greater cooling effect is imparted to first and second solid-state light sources 201R.

In addition, supplying coolant in parallel to each of solid-state light sources 201R can maintain each of solid-state light sources 201R at substantially the same temperature, as in the above-described second exemplary embodiment.

The second comparative system shown in FIG. 4 is the same as the second exemplary embodiment and the first comparative system with the exception that first and second solid-state light sources 201R, first to third solid-state light sources 201G, and solid-state light source 201B are provided in series on flow path 200.

Figure 5:
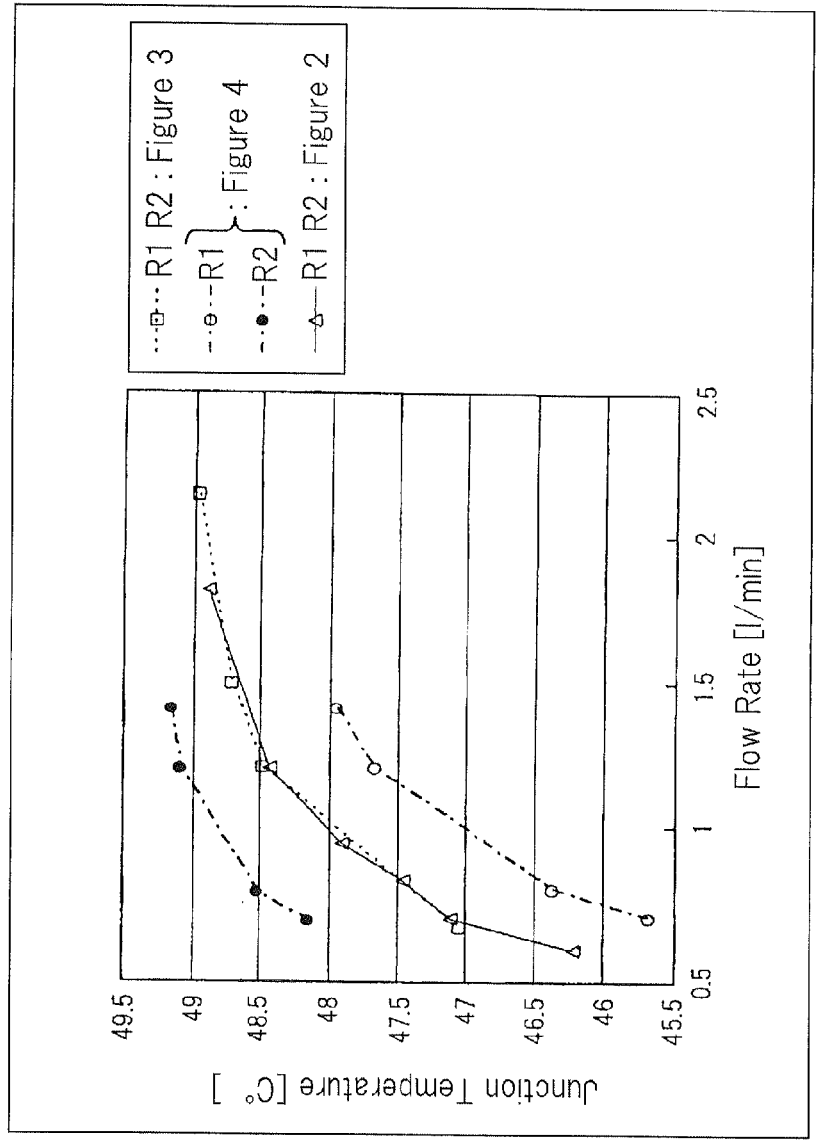
FIG. 5 is a characteristics chart showing the relation between the temperature of the junction of a red solid-state light source and the flow rate, and is the result of comparing the display device shown in FIG. 2 with the comparative systems shown in FIGS. 3 and 4.

FIG. 5 shows the relation between the flow rate and the temperature of the junction (pn junction) relating to solid-state light sources 201R and is the result of comparing the display device shown in FIG. 2 with each of the comparative systems shown in FIGS. 3 and 4. The flow rate is a value measured at the flow path between reserve tank 205 and solid-state light sources 201R.

In FIG. 5, the results indicated by white squares and broken line (R1, R2) correspond to first and second solid-state light sources 201R of FIG. 3. The results indicated by white circles and single-dot-and-dash line (R1) correspond to first solid-state light source 201R of FIG. 4, and the results indicated by the black circles and single-dot-and-dash line (R2) correspond to second solid-state light source 201R of FIG. 4. The results indicated by the white triangles and solid line (R1, R2) correspond to first and second solid-state light sources 201R of FIG. 2.

As can be seen from FIG. 5, in the second comparative system, although the temperature of first solid-state light source 201R can be suppressed to a low level, the temperature of second solid-state light source 201R becomes high. In contrast, according to the second exemplary embodiment, first and second solid-state light sources 201R are both maintained at the same temperature, and moreover, the temperature of first and second solid-state light sources 201R can be made lower than that of second solid-state light source 201R in the second comparative system.

Figure 6:
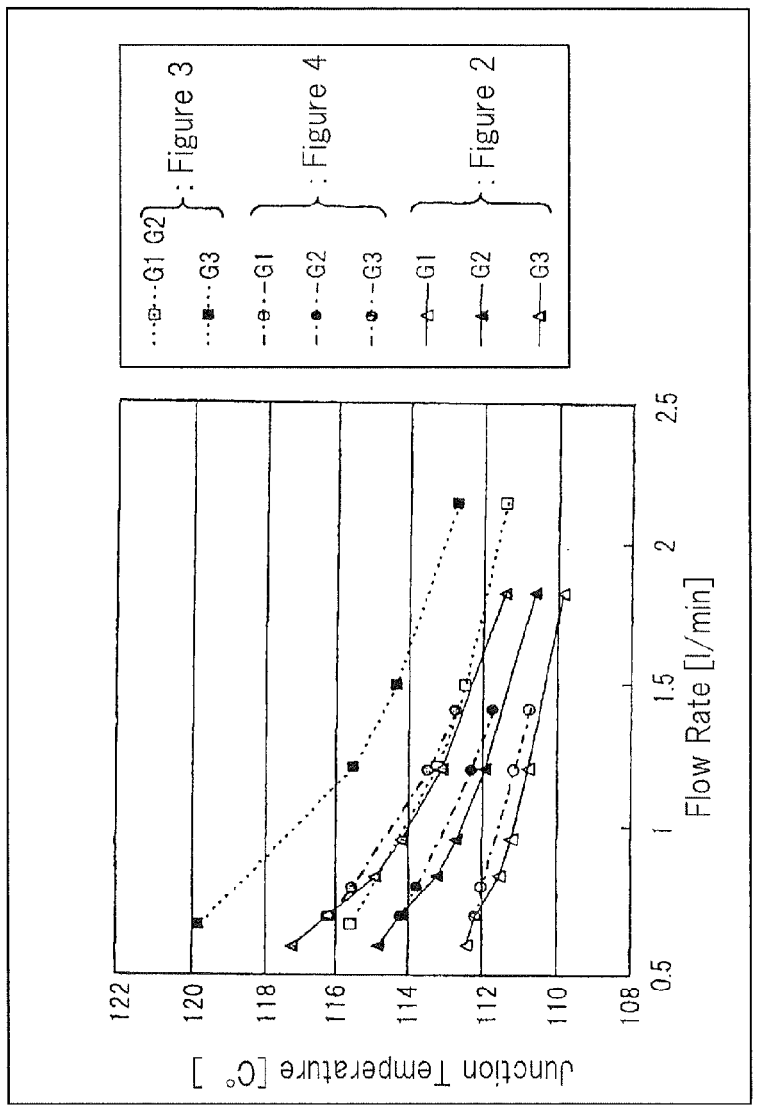
FIG. 6 is a characteristics chart showing the relation between the temperature of the junction of a green solid-state light source and the flow rate, and is the result of comparing the display device shown in FIG. 2 with the comparative systems shown in FIGS. 3 and 4.

FIG. 6 shows the relation between the flow rate and the temperature of the junction (pn junction) relating to solid-state light sources 201G and is the result of comparing the display device shown in FIG. 2 with each of the comparative systems shown in FIGS. 3 and 4. The flow rate is a value measured in the flow path between reserve tank 205 and solid-state light sources 201R.

In FIG. 6, the results indicated by the white squares and broken line (G1, G2) correspond to first and second solid-state light sources 201G of FIG. 3. The results indicated by the black squares and the broken line (G3) correspond to third solid-state light source 201G of FIG. 3. The results indicated by the white circles and the single-dot-and-dash line (G1) correspond to first solid-state light source 201G of FIG. 4, the results indicated by the black circles and single-dot-and-dash line (G2) correspond to second solid-state light source 201G of FIG. 4, and the results indicated by the gray circles and the single-dot-and-dash line (G3) correspond to third solid-state light source 201G of FIG. 4. The results indicated by the white triangles and solid line (G1) correspond to first solid-state light source 201G of FIG. 2, the results indicated by the black triangles and solid line (G2) correspond to second solid-state light source 201G of FIG. 2, and the results indicated by the gray triangles and solid line (G3) correspond to third solid-state light source 201G of FIG. 2.

As can be seen from FIG. 6, according to the configuration of the second exemplary embodiment (FIG. 2), the temperatures of first to third solid-state light sources 201G are all lower than the temperatures of first to third solid-state light sources 201G of the first comparative system (FIG. 3) and the second comparative system (FIG. 4).

Figure 7:
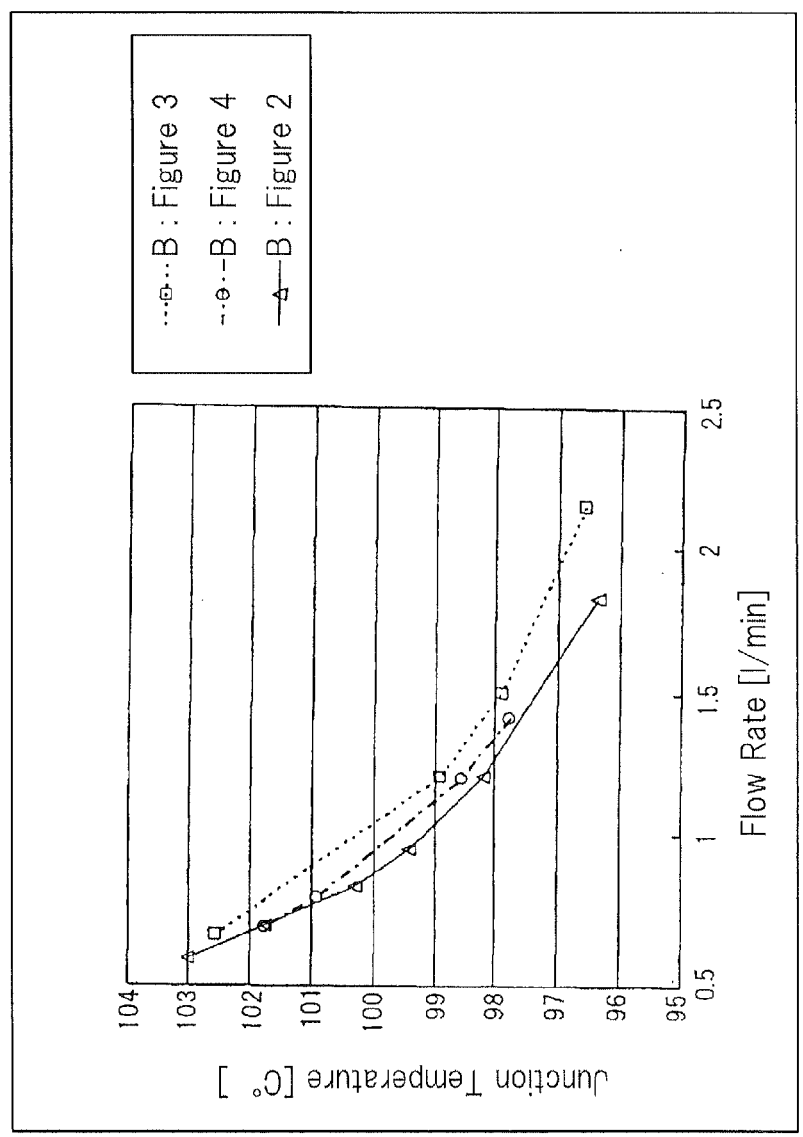
FIG. 7 is a characteristics chart showing the relation between the temperature of the junction of a blue solid-state light source and the flow rate, and is the result of comparing the display device shown in FIG. 2 with the comparative systems shown in FIGS. 3 and 4.

FIG. 7 shows the relation between the flow rate and the temperature of the junction (pn junction) relating to solid-state light source 201B and is the result of comparing the display device shown in FIG. 2 with the comparative systems shown in FIGS. 3 and 4. The flow rate is a value measured at the flow path between reserve tank 205 and solid-state light sources 201R.

In FIG. 7, the results indicated by white squares and broken line correspond to solid-state light source 201B of FIG. 3. The results indicated by the white circles and single-dot-and-dash line correspond to solid-state light source 201B of FIG. 4. The results indicated by the white triangles and solid line correspond to solid-state light source 201B of FIG. 2.

As can be seen from FIG. 7, according to the configuration of the second exemplary embodiment (FIG. 2), the temperature of solid-state light source 201B is slightly lower than the temperature of solid-state light source 201B of the first comparative system (FIG. 3) and the second comparative system (FIG. 4).

The configuration of a projector in which the cooling system of the display device of the present invention is applied is next described.

Figure 8:
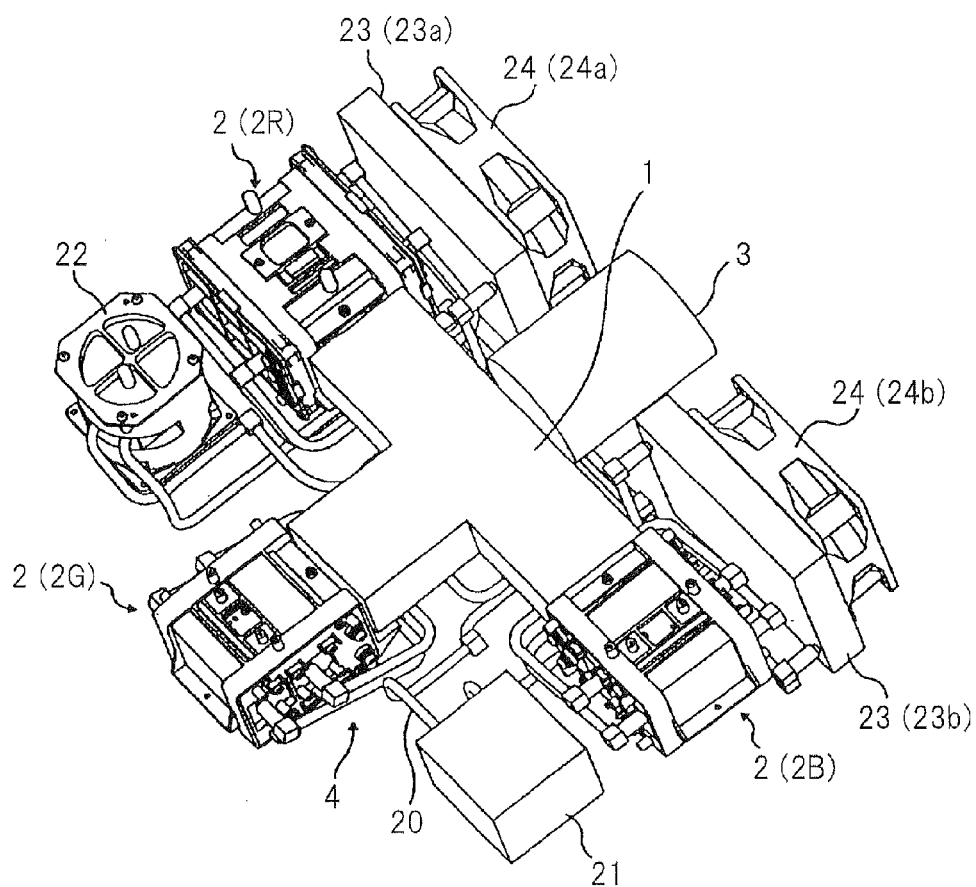
FIG. 8 is a perspective view showing a portion of the internal construction of a projector that is an exemplary embodiment of the present invention.

FIG. 8 is a perspective view showing a portion of the internal construction of the projector that is an exemplary embodiment of the present invention. In FIG. 8, depiction of the case has been omitted in the interest of showing the internal construction.

The projector according to the present exemplary embodiment includes image formation unit 1, three LED (Light Emitting Diode) light source units 2 arranged around the periphery of image formation unit 1, projection lens 3 that projects the image that was formed in image formation unit 1, and liquid cooling system 4.

Three LED light source units 2 include red light source unit 2R that generates red light, green light source unit 2G that generates green light, and blue light source unit 2B that generates blue light.

Figure 9:
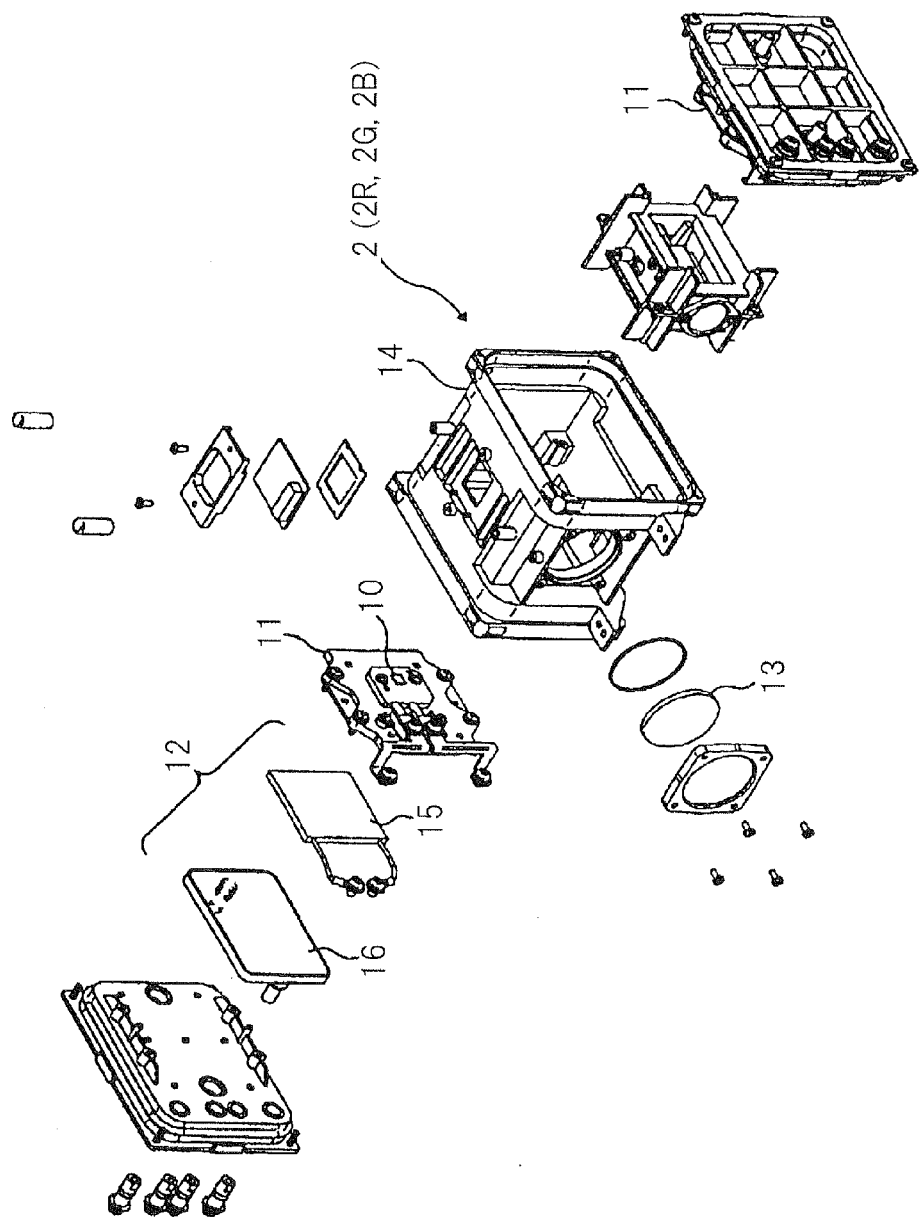
FIG. 9 is an exploded perspective view showing an example of the light source unit of the projector shown in FIG. 8.

As shown in FIG. 9 each light source unit 2 includes at least a pair of holders 11 upon each of which LED 10 is mounted, cooling mechanism 12 for maintaining the temperature of LEDs 10 at or below a predetermined temperature, and condenser lens 13. The constituent elements of each light source unit 2 that includes holders 11, cooling mechanism 12 and condenser lens 13 are housed in box 14 and unified. In addition, the pair of holders 11 in each light source unit 2 are arranged opposite each other, and the light that is emitted from each of LEDs 10 that are mounted on respective holder 11 is condensed by condenser lens 13 and irradiated into image formation unit 1 (FIG. 8).

Again referring to FIG. 8, image formation unit 1 includes at least a cross-dichroic prism and three liquid crystal panels arranged around the prism. Three liquid crystal panels are prepared for each light source unit. Each liquid crystal panel modulates light that is emitted from each light source unit 2 based on picture signals. In other words, light (red light) that is emitted from red light source unit 2R is irradiated into the liquid crystal panel for red, and modulated. Light (green light) that is emitted from green light source unit 2G is irradiated into the liquid crystal panel for green, and modulated. Light (blue light) that is emitted from blue light source unit 2B is irradiated into the liquid crystal panel for blue, and modulated. Light that has been modulated by each of the liquid crystal panels is then combined by the cross-dichroic prism and projected onto, for example, a screen by way of projection lens 3.

The liquid cooling system is next described. Liquid cooling system 4 includes flow path 20 that passes by way of light source units 2R, 2G, and 2B. At least pump 21, reserve tank 22, radiator 23, and fan 24, that supplies cooling air to radiator 23, are arranged on flow path 20. Liquid cooling system 4 is further provided with two radiators (first radiator 23a and second radiator 23b) and two fans (first fan 24a and second fan 24b) that each supply cooling air to a respective radiator 23a or 23b. Flow path 20 is made up by a tube that is flexibility.

Figure 10:
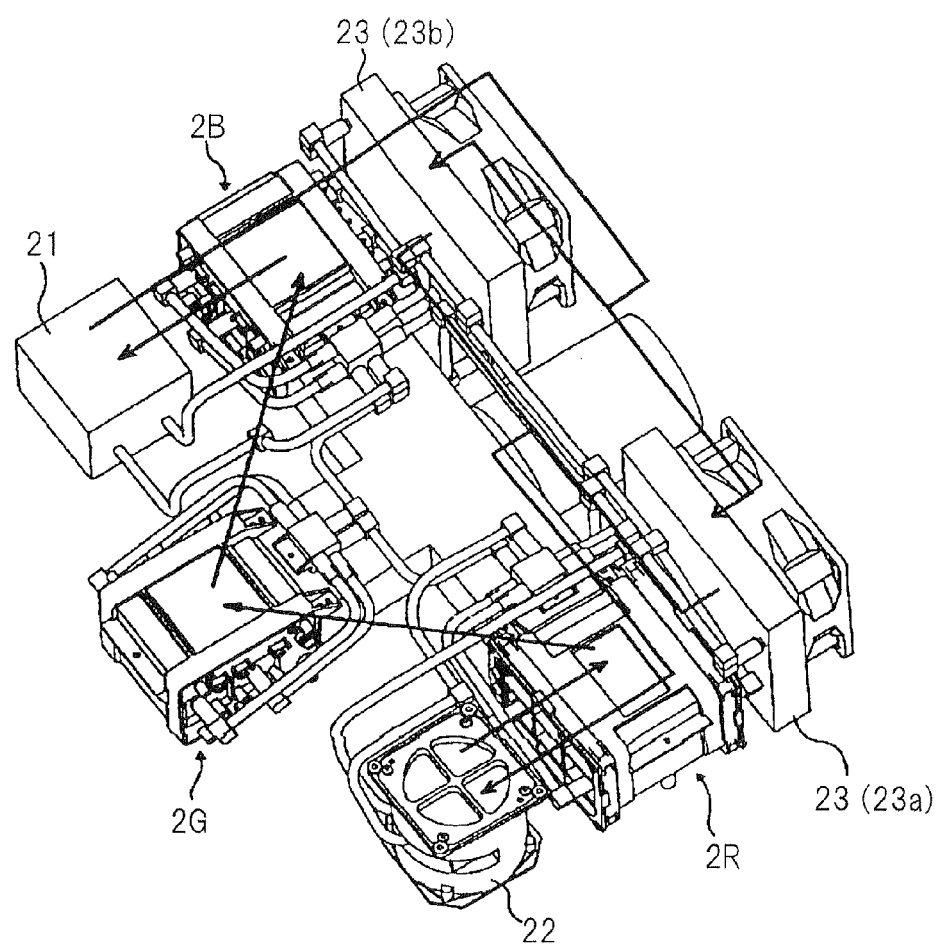
FIG. 10 is a schematic view showing the flow of coolant in the liquid cooling system of the projector shown in FIG. 8.

FIG. 10 gives a schematic representation of the flow of the coolant in liquid cooling system 4. The arrows in FIG. 10 indicate the flow of the coolant inside liquid cooling system 4. Although the arrows in FIG. 10 show the main flow of coolant, they do not exactly match the actual flow path design.

Coolant that is issued from pump 21 is branched before radiator 23 and diverted to each of first radiator 23a and second radiator 23b. The coolant that is caused to flow into each of radiators 23a and 23b is cooled by heat exchange. The coolant that issues from first radiator 23a and second radiator 23b flows together and into reserve tank 22.

The coolant that flows from reserve tank 22 flows into red light source unit 2R and cools the LEDs in this light source unit 2R. The coolant then flows by way of green light source unit 2G and blue light source unit 2B and returns to pump 21.

Coolant that flows into green light source unit 2G and blue light source unit 2B cools the LEDs in each of light source units 2G and 2B. In other words, when pump 21 is taken as the origin, the coolant circulates in the order of pump 21, radiator 23, reserve tank 22, red light source unit 2R, green light source unit 2G, blue light source unit 2B, and then back to pump 21.

Because the coolant follows the above-described circulation route, the temperature of the coolant is lowest immediately after flowing out of radiator 23, and the temperature of the coolant rises gradually as it progressively passes through each of light source units 2R, 2G, and 2B.

Here, the amount of heat generated by the red LED incorporated in red light source unit 2R is less than the amount of heat generated by the green LEDs and blue LEDs that are incorporated in the other light source units 2G and 2B.

However, red LEDs are more sensitive to temperature change than green LEDs or blue LEDs. In other words, change in the temperature characteristics of red LEDs are steeper than the changes in the temperature characteristics of green LEDs or blue LEDs. As a result, controlling the temperature of red LEDs is of the greatest importance.

Accordingly, the above-described flow path design has been adopted. In other words, a flow path design has been adopted in which coolant that has been cooled in radiator 23 is first supplied to red light source unit 2R.

A pair of LEDs 10 are incorporated in each light source unit 2. Apart from temperature control, it is also preferable that the temperature difference between two LEDs 10 be small. In particular, the temperature difference between the pair of red LEDs 10 that are incorporated in red light source unit 2R is preferably kept as close as possible to zero.

Accordingly different flow path designs are adopted in red light source unit 2R and other light source units 2G and 2B. More specifically, a parallel flow path is provided in red light source unit 2R, and a serial flow path is provided in green light source unit 2G and blue light source unit 2B.

As shown in FIG. 9, a pair of holders 11, LED 10 being mounted on the surface of each holder 11, are provided opposite each other inside box 14 of each light source unit 2. In addition, a heat-dissipating element (in the present exemplary embodiment, Peltier element 15) is arranged in close contact to the rear surface of each holder 11 of red light source unit 2R. Still further, cold plate 16 is arranged in close contact to the rear surface of Peltier element 15. Although two assemblies of holder 11, Peltier element 15 and cold plate 16 are incorporated inside box 14, FIG. 9 shows the construction of only one of the assemblies. However, the two assemblies are of identical construction.

The coolant flows into cold plate 16 by way of an inflow port and flows out of cold plate 16 by way of an outflow port. In other words, heat exchange takes place between Peltier Element 15 and the coolant by way of cold plate 16. To rephrase yet again, heat exchange takes place between the coolant and LED 10 by way of cold plate 16 and Peltier element 15.

Returning to the description of differences between the flow path designs of the light source units, coolant that flows into red light source unit 2R having the above-described construction is branched and supplied to each of two cold plates 16. On the other hand, coolant that flows into green light source unit 2G and blue light source unit 2B is supplied successively to two cold plates 16 without being branched. Accordingly, two red LEDs 10 that are incorporated in red light source unit 2R are cooled by coolant of the same temperature.

As described hereinabove, coolant whose temperature has reached its lowest state is supplied to red light source unit 2R. In other words, two red LEDs 10 that are incorporated in red light source unit 2R are uniformly cooled by coolant that has the lowest temperature, and moreover, that has the same temperature. As a result, the temperature of two red LEDs 10 is maintained at or below a predetermined temperature, and moreover, the temperature difference between two red LEDs 10 is kept as close as possible to zero.

Two LEDs 10 that are incorporated in each of green light source unit 2G and blue light source unit 2B having serial flow paths are cooled by coolants each having a different temperature. More specifically, later-stage LEDs 10 are cooled by coolant in which temperature has been raised by heat exchange with early-stage LEDs 10. Still more specifically, coolant that flows into green light source unit 2G flows into later-stage cold plate 16 to cool later-stage green LED 10 after having flowed into early-stage cold plate 16 to cool early-stage green LED 10. Similarly, coolant that flows into blue light source unit flows into later-stage cold plate 16 to cool later-stage blue LED 10 after having flowed into early-stage cold plate 16 to cool early-stage LED 10.

However, changes in luminance due to temperature changes of green LEDs 10 and blue LEDs 10 are smaller than for red. LEDs 10. As a result, a certain amount of temperature difference is permissible between two green LEDs 10 in green light source unit 2G. Similarly, a certain amount of temperature difference is permissible between two blue LEDs 10 in blue light source unit 2B.

By means of the cooling system of the display device of the present invention as described hereinabove, solid-state light sources having a greater degree of luminance change (solid-state light sources that experience a greater decrease in luminance due to increase in temperature) are cooled by a coolant of a lower temperature. In other words, solid-state light sources that are sensitive to change in temperature have a higher cooling effect. As a result, the decrease in luminance due to temperature increase in each solid-state light source is suppressed as a whole, whereby luminance balance (illumination balance) of each solid-state light source can be maintained and a display device can be provided that has optimum white balance with high luminance.

Although the present invention has been described hereinabove with reference to exemplary embodiments, the present invention is not limited to the above-described exemplary embodiments. The configuration and operations of the present invention are open to various modifications within a range that does not depart from the gist of the present invention that will be clear to a person of ordinary skill in the art.

This application claims the benefits of priority based on Japanese Patent Application No. 2010-125109 for which application was submitted on May 31, 2010 and incorporates by citation all of the disclosures of that application.

POTENTIAL UTILITY IN INDUSTRY

The present invention can be generally applied to display devices that are equipped with, as a light source, a plurality of light sources for which the colors of emitted light differ, and more specifically, can be applied to a display device or projector that uses a light modulation device such as a liquid crystal panel or a DMD.

What is claimed is:

1. A display device equipped with a plurality of solid-state light sources, comprising:
a coolant-circulating unit that is provided with a flow path formed to pass through each of said plurality of solid-state light sources and that circulates a coolant by way of the flow path,
wherein:
each of said plurality of solid-state light sources has a property by which luminance changes according to temperature change, and
said flow path is formed such that said coolant first passes through, from among said plurality of solid-state light sources, solid-state light sources having a greater degree of luminance change according to said property, wherein:
said plurality of solid-state light sources includes a plurality of first solid-state light sources that emit light of a first color, the degree of said change in luminance of these first solid-state light sources being greater than other solid-state light sources, and
said flow path includes a plurality of branch flow paths that are provided in parallel and that are arranged to correspond to said plurality of first solid-state light sources in a one-to-one relationship, said coolant separately passing through each of said plurality of first solid-state light sources via said plurality of branch flow paths,
wherein said plurality of branch flow paths are joined at a junction part to form a joined flow path through which the coolant that passed through said plurality of first solid-state light sources is supplied to said other solid-state light sources.

2. The display device as set forth in claim 1, wherein said other solid-state light sources are provided in series on a flow path that follows confluence of said plurality of branch flow paths.

3. The display device as set forth in claim 1, wherein:
said other solid-state light sources includes:
a plurality of second solid-state light sources that emit light of a second color that differs from said first color; and
at least one third solid-state light source that emits light of a third color that differs from said first and second colors,
the degree of said change in luminance of said plurality of second solid-state light sources is greater than for said third solid-state light source, and
the flow path that follows confluence of said plurality of branch flow paths is formed such that said coolant passes by way of said plurality of second solid-state light sources before it passes by way of said third solid-state light source.

4. The display device as set forth in claim 1, wherein:
said coolant-circulating unit includes:
a plurality of radiators provided in parallel; and
a plurality of fans that each supplies cooling air to a respective radiator of said plurality of radiators, and
wherein said coolant that circulates through said flow path is branched and supplied to each of said plurality of radiators.

5. The display device as set forth in claim 1, wherein the flow path is formed such that an order of cooling the plurality of solid-state light sources is based on the degree of change in luminance.

6. The display device as set forth in claim 1,
wherein the plurality of branch flow paths that are provided in parallel has the coolant separately passing first through all of said plurality of first solid-state light sources via said plurality of branch flow paths, and
wherein the solid-state light sources in which the degree of luminance change is greater than other solid state light sources are cooled by the coolant at a lower temperature than the other solid state light sources from an order of cooling the plurality of solid-state light sources.

7. The display device as set forth in claim 1, wherein the junction part forms the joined flow path through which the coolant that passed through said plurality of first solid-state light sources is supplied to said other solid-state light sources in a series of stages of the other solid-state light sources.

8. The display device as set forth in claim 2, wherein:
said other solid-state light sources includes:
a plurality of second solid-state light sources that emit light of a second color that differs from said first color; and
at least one third solid-state light source that emits light of a third color that differs from said first and second colors,
the degree of said change in luminance of said plurality of second solid-state light sources is greater than for said third solid-state light source, and
the flow path that follows confluence of said plurality of branch flow paths is formed such that said coolant passes by way of said plurality of second solid-state light sources before it passes by way of said third solid-state light source.

9. The display device as set forth in claim 2, wherein:
said coolant-circulating unit includes:
a plurality of radiators provided in parallel; and
a plurality of fans that each supplies cooling air to a respective radiator of said plurality of radiators, and
wherein said coolant that circulates through said flow path is branched and supplied to each of said plurality of radiators.

10. The display device as set forth in claim 3, wherein said plurality of first solid-state light sources is made up by two red LEDs (light emitting diodes) that emit red light, said plurality of second solid-state light sources is made up by three green LEDs that emit green light, and said third solid-state light source is made up by one LED that emits blue light.

11. The display device as set forth in claim 3, wherein:
said coolant-circulating unit includes:
a plurality of radiators provided in parallel; and
a plurality of fans that each supplies cooling air to a respective radiator of said plurality of radiators, and
wherein said coolant that circulates through said flow path is branched and supplied to each of said plurality of radiators.

12. The display device as set forth in claim 10, wherein:
said coolant-circulating unit includes:
a plurality of radiators provided in parallel; and
a plurality of fans that each supplies cooling air to a respective radiator of said plurality of radiators, and
wherein said coolant that circulates through said flow path is branched and supplied to each of said plurality of radiators.

13. A display device equipped with a plurality of solid-state light sources, comprising:
a coolant-circulating unit that is provided with a flow path formed to pass through each of said plurality of solid-state light sources and that circulates a coolant by way of the flow path,
wherein:
each of said plurality of solid-state light sources has a property by which luminance changes according to temperature change, and
said flow path is formed such that said coolant first passes through, from among said plurality of solid-state light sources, solid-state light sources having a greater degree of luminance change according to said property,
wherein said flow path is formed such that said coolant passes through the plurality of solid-state light sources in an order starting with the solid-state light sources having the greater degree of luminance change according to said property,
wherein said plurality of solid-state light sources includes a plurality of first solid-state light sources that emit light of a first color, the degree of said change in luminance of these first solid-state light sources being greater than other solid-state light sources, and
wherein said flow path includes a plurality of branch flow paths that are arranged to correspond to said plurality of first solid-state light sources in a one-to-one relationship, said coolant separately passing through each of said plurality of first solid-state light sources via said plurality of branch flow paths,
wherein said plurality of branch flow paths are joined at a junction part to form a joined flow path through which the coolant that passed through said plurality of first solid-state light sources is supplied to said other solid-state light sources.

14. The display device as set forth in claim 13, wherein the flow path is formed such that an order of cooling the plurality of solid-state light sources is based on the degree of change in luminance.

15. The display device as set forth in claim 13, wherein the plurality of branch flow paths that are provided in parallel has the coolant separately passing first through all of said plurality of first solid-state light sources via said plurality of branch flow paths, and
wherein the solid-state light sources in which the degree of luminance change is greater than other solid state light sources are cooled by the coolant at a lower temperature than the other solid state light sources from an order of cooling the plurality of solid-state light sources.

16. The display device as set forth in claim 7, wherein said other solid-state light sources comprises:
a plurality of second solid-state light sources that emit light of a second color that differs from said first color; and
at least one third solid-state light source that emits light of a third color that differs from said first and second colors.

* * * * *